US000001038H

United States Statutory Invention Registration [19]

[11] Reg. Number: H1038

[43] Published: Apr. 7, 1992

Snyder

[54] ISOLATED TRANSDUCER NOSE SECTION

[75] Inventor: Roger F. Snyder, State College, Pa.

[73] Assignee: The United States of America as represented by the Secretary of the Navy, Washington, D.C.

[21] Appl. No.: 275,539

[22] Filed: Jun. 18, 1981

[51] Int. Cl.[5] ..... F42B 19/00

[52] U.S. Cl. ..... 114/20.1; 114/22

[58] Field of Search ..... 114/20 R, 20 A, 22, 114/356, 357, 358; 248/631, 632, 634

[56] References Cited

U.S. PATENT DOCUMENTS

| | | | |
|---|---|---|---|
| 2,072,244 | 3/1937 | Coursen | 248/632 |
| 2,184,482 | 12/1939 | Austin et al. | 114/22 UX |
| 2,239,319 | 4/1941 | Halford et al. | 248/634 |
| 2,504,634 | 4/1950 | Boschi | 114/22 UX |
| 2,811,216 | 10/1957 | Harris | 114/22 UX |
| 2,899,923 | 8/1959 | Daly et al. | 114/20 R |
| 2,977,919 | 4/1961 | Blake | 114/20 R |
| 3,130,700 | 4/1964 | Peterson | 114/20 R |
| 3,142,849 | 8/1964 | Jagemann et al. | 114/356 X |
| 3,372,662 | 3/1968 | Nisewanger | 114/20 R |
| 4,346,664 | 8/1982 | Enzian | 114/357 X |

*Primary Examiner*—David H. Brown
*Attorney, Agent, or Firm*—Michael J. McGowan; Prithvi C. Lall

[57] ABSTRACT

An apparatus and method for isolating one part of a body from mechanical vibrations from another part thereof by providing a flexible gasket between the two parts of the body. The flexible gasket includes a plurality of voids to permit adequate space for the deformed gasket when the body is subjected to varying dynamic conditions. One embodiment of the apparatus is a transducer nose section of a torpedo which includes a pliable gasket for isolating the acoustic transducers housed therein from extraneous shell-born and mechanical vibrations. It further includes two pieces or elements such as the aft piece and forward piece which are kept a certain distance apart to create a gap using a plurality of shims and polyurethene is poured in between the two elements so as to form the pliable gasket. The shims are then removed leaving voids in the polyurethene gasket. Alternatively, polyurethene poured in between the two elements is drilled at a plurality of spaces to create voids therein.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ISOLATED TRANSDUCER NOSE SECTION

BACKGROUND OF THE INVENTION

This invention relates to a device for reducing mechanical vibrations from being transferred from one part of a body to another part thereof and, more particularly to insulating a transducer nose section of a torpedo from shell-born and other mechanical vibrations from being transferred from the remaining part thereof.

Isolation of the transducer assembly housed in the nose section of a torpedo from the remaining parts of the torpedo has been attempted many times in the past but without success. The reason for failure of such attempts is due to the necessity for the use of metal-to-metal fasteners (bolts, pins, etc.) which short circuit any mode of isolation. Furthermore, it is also due to the fact that the isolation material is not provided with adequate gap or space for proper expansion and contraction necessary for compliancy under pressure excursions due to change in depth of the torpedo in water. Additionally, the noise isolation efforts have also failed due to stiffness of the isolation material at extreme depth which produces the same effect as metal-to-metal contact. If the isolation material is too soft, it has a tendency to buldge at depth pressure which could produce unwanted cavitation effects. It is thus desirable to have a device which will isolate the transducer assembly housed in the nose section of a torpedo from shell-born vibrations and other mechanical vibrations.

SUMMARY OF THE INVENTION

The objects and novel feature of the subject invention are accomplished by keeping a certain gap or space between the two pieces of a transducer nose section and providing a polyurethene gasket in the space there between so that the polyurethene gasket has a plurality of voids therein. This provides for appropriate expansion and contraction of the gasket when the torpedo is subjected to different hydrostatic pressures.

An object of the subject invention is to have a method of reducing unwanted mechanical vibration being transferred from one part of a body to another part thereof under varying dynamical conditions.

Another object of the subject invention is to isolate transducer nose section of a torpedo from shell-born and other mechanical vibrations.

Still another object of the subject invention is to provide a pliable gasket between the two elements or parts of the transducer nose section.

An additional object of the subject invention is to have a plurality of voids in the pliable gasket in order to provide for its expansion and contraction space necessary for its compliancy.

Other objects, advantages and novel features of the invention will become apparent from the following detailed description of the invention when considered in conjunction with the accompanying drawing wherein:

DESCRIPTION OF A PREFERRED EMBODIMENT

Figure 2:
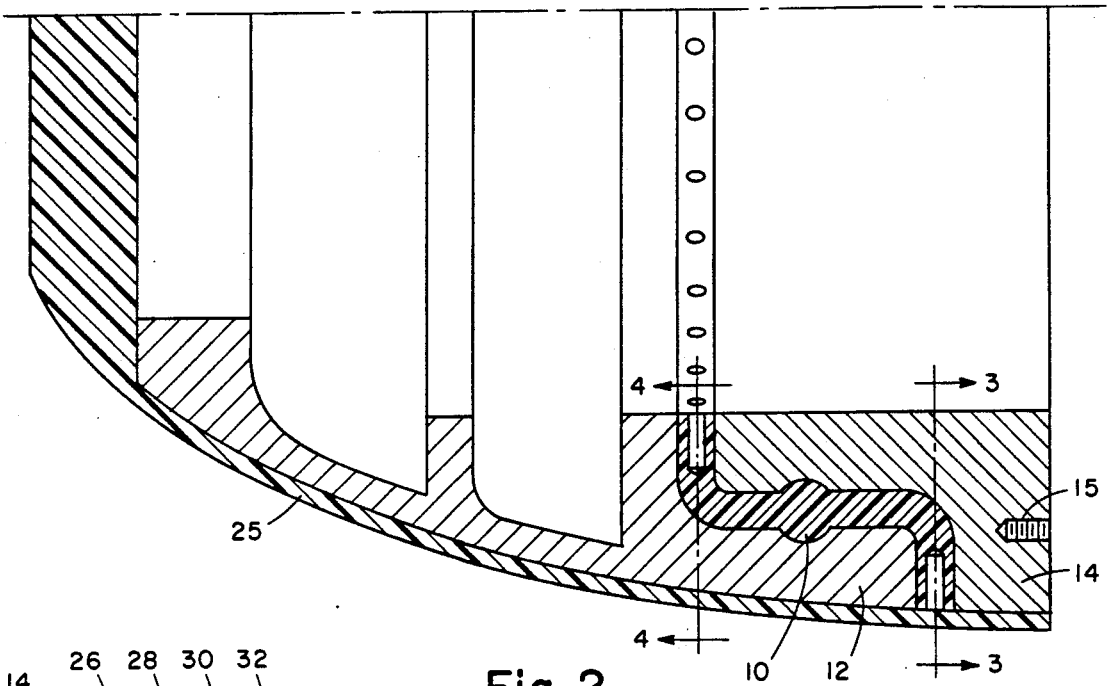
FIG. 2 is a partially cross-sectional view of the nose section with a pliable gasket installed therein.
Figure 1:
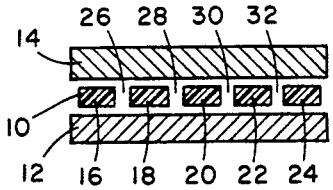
FIG. 1 schematically shows the position of a pliable gasket between the two parts of a body such as a transducer nose section.
Figure 3:
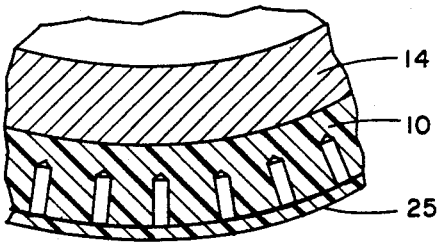
FIG. 3 is a cross-sectional view of FIG. 2 taken along line 3—3 when viewed in the direction of the arrows.
Figure 4:
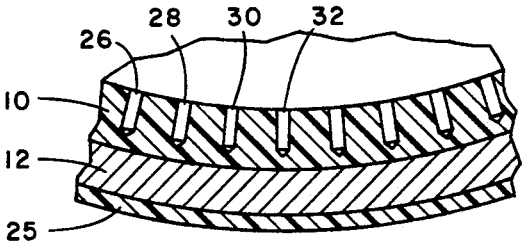
FIG. 4 is a cross-sectional view of FIG. 2 taken along line 4—4 as viewed in the direction of the arrows.

Referring to FIG. 1, a pliable gasket 10 which can withstand high hydrostatic pressures is shown wherein the forward element or part 12 of a transducer nose section and an aft element or part 14 of transducer nose section are separated by polyurethene gasket 10. As shown in FIGS. 1 and 2, elements 12 and 14 are maintained at a fixed distance apart so as to create a gap or space by using a plurality of shims or the like. Element 14 is bolted to the remaining part of the torpedo by bolts such as one adapted for hole 15. Polyurethene is then poured in to fill the space in between elements 12 and 14, thus forming sections 16, 18, 20, 22, 24 and 25 of gasket 10. The shims are then withdrawn so as to create voids 26, 28 and 30 and 32. Alternatively, polyurethene or any other suitable material is poured in the space between elements 12 and 14 and voids 26, 28, 30 and 32 are created by drilling out the polyurethene gasket as shown in FIGS. 3 and 4. When the transducers assembly is subjected to high hydrostatic pressures at greater depths in water, various sections of gasket 10 are deformed so as to occupy some of the adjoining voids and consequently the integrity and flexibility of the gasket is maintained. The use of a flexible gasket having a plurality of voids therein eliminates the use of metal-to-metal fasteners and, thus isolates transducer nose section from the remaining section of the torpedo which is the source of shell-born vibrations and other mechanical vibrations. FIG. 3 is a cross section along line 3—3 of FIG. 2 which shows the isolation joint in the environment of a transducer assembly on a torpedo. FIG. 4 is a cross section of FIG. 2 taken along line 4—4. It should be clearly understood that the teachings of the subject invention can be applied to any arrangement wherein one part of a body is to be insulated from the mechanical vibrations from another part of the body and the embodiment fully described above should not be regarded as a limitation.

Thus an isolated transducer nose section for attenuating the shell-born vibrations to a transducer assembly housed therein includes a pliable gasket having a plurality of voids therein. Some of the space provided by the voids in the flexible gasket is occupied because of the deformation of the flexible gasket under high pressure resulting from greater depths of water.

Obviously, many modifications and variations of the present invention are possible in the light of the above teachings. For example, it is possible to use materials other than polyurethene to form a flexible gasket in between the two elements of a body such as a transducer nose section. Furthermore, the voids between different portions of the flexible gasket can be obtained in some other like manner. It should further be clearly understood that the teachings of subject invention may be used for isolating two work pieces of a machine and thus prevent mechanical vibrations from being transferred from one work piece to the other work piece. It is, therefore, understood that within the scope of the appended claims the invention may be practiced otherwise than as specifically described.

What is claimed is:

1. An apparatus for isolating a first part of a body from mechanical vibrations from a second part thereof comprising a flexible gasket means between said first part of the body and said second part of the body, said flexible gasket means includes a plurality of voids for expansion and contraction of said flexible gasket means under different dynamic conditions.

2. The apparatus of claim 1 wherein said flexible gasket is fabricated from a flexible material.

3. The apparatus of claim 2 wherein said flexible material is polyurethane.

4. An isolated transducer nose section of a torpedo having attenuated shell-born and mechanical vibrations from the remaining section of the torpedo, which comprises:

a generally conical element of the transducer nose section of the torpedo;

a generally cylindrical second element of the transducer section of the torpedo;

means for keeping said first element and said second element of the transducer nose section a fixed distance apart and thus forming a gap therebetween; and means for providing a flexible material in said gap and creating a plurality of voids in the flexible material in said gap.

5. The nose section of claim 4 wherein said flexible material is polyurethane.

6. A method of isolating a first part of a body from mechanical vibrations in a second part of the body which includes the steps of:

maintaining said first part and said second part of the body a fixed distance apart creating a gap therebetween; and pouring polyurethane in said gap.

7. The method of claim 6 which further includes the step of drilling a plurality of holes in the poured polyurethane in said gap and thus providing a plurality of voids in the poured polyurethane.

* * * * *